United States Patent [19]

Deringer

[11] Patent Number: 4,708,383
[45] Date of Patent: Nov. 24, 1987

[54] MANIPULATOR GRIPPER TOOL

[75] Inventor: Thomas J. Deringer, Boca Raton, Fla.

[73] Assignee: International Business Machines Corporation, Armonk, N.Y.

[21] Appl. No.: 879,744

[22] Filed: Jun. 27, 1986

[51] Int. Cl.[4] .............................................. B25J 15/00
[52] U.S. Cl. .................................. 294/86.4; 294/902; 901/39
[58] Field of Search ............. 294/1.1, 86.4, 88, 103.1, 294/106, 119.1, 902; 269/130–132, 257, 271, 279–284; 414/729, 730, 739, 741, 744 A, 751; 901/30, 31, 36, 37, 39

[56] References Cited

U.S. PATENT DOCUMENTS 4,105,241 8/1978 Mee ..................................... 294/86.4
4,500,126 2/1985 Tur-Kaspa et al. ................ 294/86.4
4,543,032 9/1985 Leverett et al. ................... 901/31 X

FOREIGN PATENT DOCUMENTS 785028 12/1980 U.S.S.R. ............................. 294/86.4
814723 3/1981 U.S.S.R. .............................. 294/902
1007970 3/1983 U.S.S.R. ............................. 294/86.4

Primary Examiner—Johnny D. Cherry

[57] ABSTRACT

An end of arm tool attached to the fingers of a robot gripper, and having a first band and a pair of bands extending at right angles respectively from a first and second clamp attached to the respective fingers of the gripper, the first bands and the pair of bands being interleaved to provide a large common area defined between the bands when the fingers are brought together and centering and grasping an object disposed therein when the fingers are moved away from the another.

5 Claims, 7 Drawing Figures

MANIPULATOR GRIPPER TOOL

FIELD OF THE INVENTION

The invention relates to a manipulator gripper tool, and more particularly, to a tool which is adapted to attach to the gripper at the end of the arm of a manipulator for centering the grasping thin elongated objects at right angles to their lengthwise axis.

BACKGROUND OF THE INVENTION

Today's grippers located at the end of a manipulator arm have gripper fingers attached which face one another and close toward each other under control of the gripper drive to grasp an object located there between. These kind of tools or gripper fingers, when used to pick up long thin objects especially when they are standing on end, require the object to be precisely located so that it is centered between the fingers and is not tilted. If the object is tilted or off center the subsequent operation, such as inserting the component into a hole, cannot be performed.

The accuracy with which a manipulator arm can be positioned is to some extent dependent on the weight carried at the end of the arm. Therefore, any tool attached at the end of the arm should be as light as possible.

The tool should also be easily attachable to the gripper fingers and have a means for easily and quickly locking in place so that the cycle time of the operation being performed is not adversely effected.

In view of today's variety of applications for high speed manipulators, it is not only necessary to have a tool which is light in weight, which is easily attachable and detachable and locks into position, but most importantly to have a tool which is capable of centering an object to be picked up and maintaining its axial orientation during the time it is held.

DESCRIPTION OF THE PRIOR ART

The closes known prior art is U.S. Pat. No. 4,105,241 titled "Grappling Device", which includes a grappling head defining an opening therein across which flexible grappling cables extend. The grappling cables are moveable from a first position in which they are taut and extend across the opening in the head at uniformly spaced circumferential intervals to intersect one another to provide a grappling aperture there between within which a component may be centrally located with respect to the head by engagement with the grappling cables and a second position in which the opening is substantially enlarged to admit a component thereto. Drive means are mounted on the head for moving the cables between the first and second positions.

The patent does not disclose a light weight tool which is easily and quickly attachable to the fingers of a manipulator, and which centers and grasps an elongated object with respect to its lengthwise axis as the fingers of the gripper are driven away from each other.

SUMMARY OF THE INVENTION

Briefly, the invention consists of a tool having first and second clamp means which are attachable to respective fingers of a manipulator gripper which can be driven away from and towards each other.

A first closed loop holding band is attached to and extends at right angles to the first clamp and a pair of closed loop holding bands are attached to the second clamp and extend at right angles thereto parallel to each other and separated by at least the width of the first closed loop holding band extending from the first clamp. The first closed loop holding band is inserted into and retracted from the space between the pair of closed loop holding bands forming a variable work space in the area defined within all three bands as the parallel facing fingers are moved toward and away from each other. An elongated object extending vertically in the workspace is centered and grasped by the closed loop holding bands as the fingers are driven away from one another so that the lengthwise axis is maintained vertical with respect to the workspace and centered with respect to the gripper fingers. The object is released as the fingers are driven toward one another.

The invention further includes a locating and locking detent mechanism for locating and locking the end of arm tool to the fingers of the gripper.

Other objects, features and advantages of the invention will be apparent to those skilled in the art from the following description of a preferred embodiment of the invention, wherein reference is made to the accompanying drawings, of which:

DESCRIPTION OF THE PRFERRED EMBODIMENT

Figure 1:
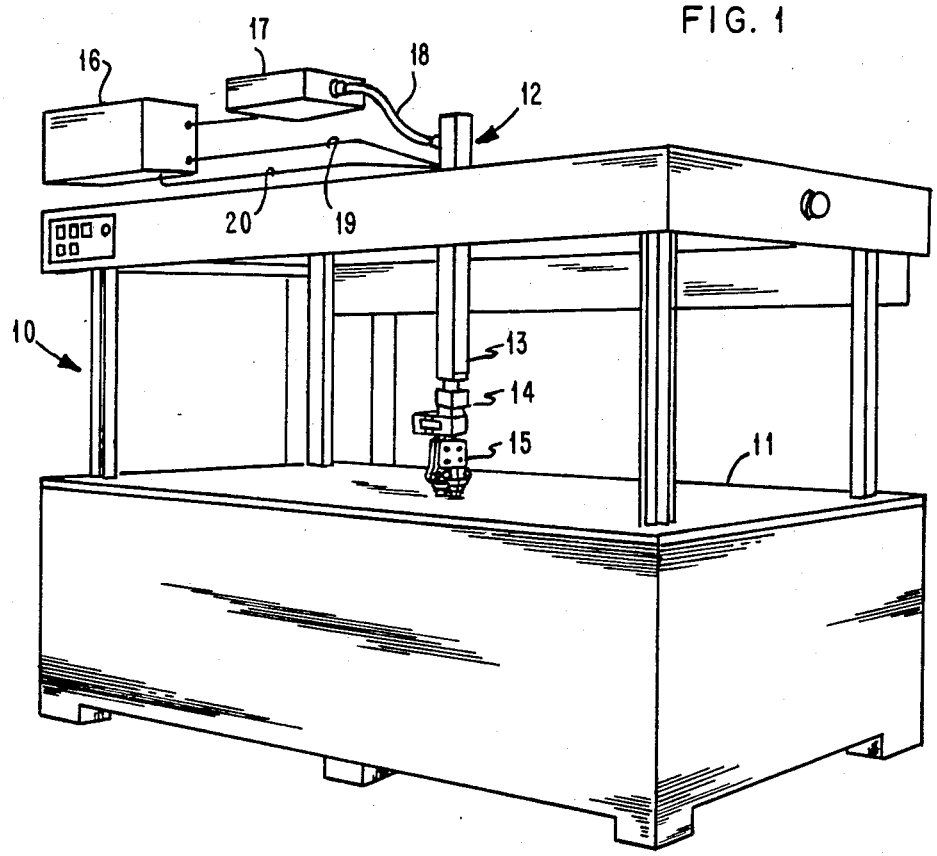
FIG. 1 is a simplified perspective view of a manipulator, including a gripper with which our invention may be used.

Referring to FIG. 1, there is shown a schematic diagram of a robot or manipulator 10 of the so called box frame type which is marketed by International Business Machines Corporation under the name of 7565 Manufacturing System. Except for the end of arm tool described herein, the remainder of the robot, including its control system, is known to those skilled in the art. The end of arm centering and grasping tool of this invention is not limited to this manipulator, but is adaptable to most robots having a gripper of the type having facing fingers for grasping objects.

The manipulator 10 comprises a table 11 having an overhead carriage assembly 12 which supports an arm 13 for X, Y and Z movements throughout the workspace over table 11.

The arm 13 carries at the lower end thereof a wrist mechanism 14 to which is attached a gripper 15 by means of which tools can be grasped and manipulated. The 3 degrees of freedom of the arm 13 and the various degrees of freedom of the wrist mechanism 14 enable the gripper 15 to be moved and oriented as required by the control means to perform a variety of tasks.

The gripper 15 is controlled by a computer 16 which controls a hydraulic power source 17 connected through hydraulic line 18 to the various operating units on the arm 13.

Electrical power for operating various switches and sensors is delivered through electrical line 19 from the control computer 16. Feedback from various sensors within the gripper 15, and elsewhere in the manipulator 10, is delivered to the computer 16 through cable 20.

Figure 2:
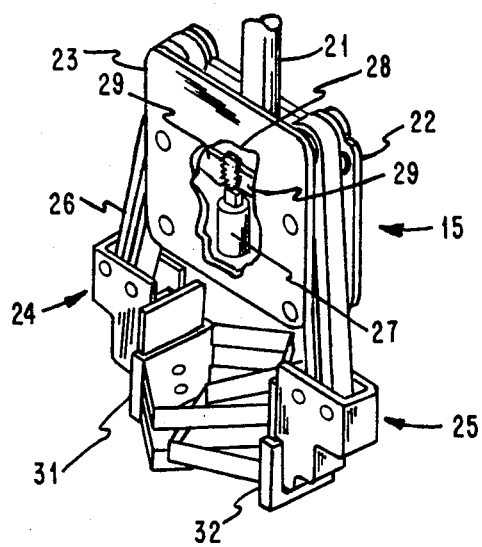
FIG. 2 is an enlarged perspective view of a gripper of the type used in the manipulator of FIG. 1, which shows the fingers attached to the gripper to which our invention in turn is attached.

FIG. 2 shows the details of the gripper 15. The gripper 15 is supported by shaft 21 from the wrist mechanism 14 of FIG. 1 and includes a frame structure provided by plates 22 and 23 and a pair of opposed fingers 24 and 26, each of which is suspended from the frame by a pair of articulated parallel links 26. The links 26 are mounted in such a way as to enable the fingers 24 and 25 to remain parallel while moving relative to one another.

Figure 3:
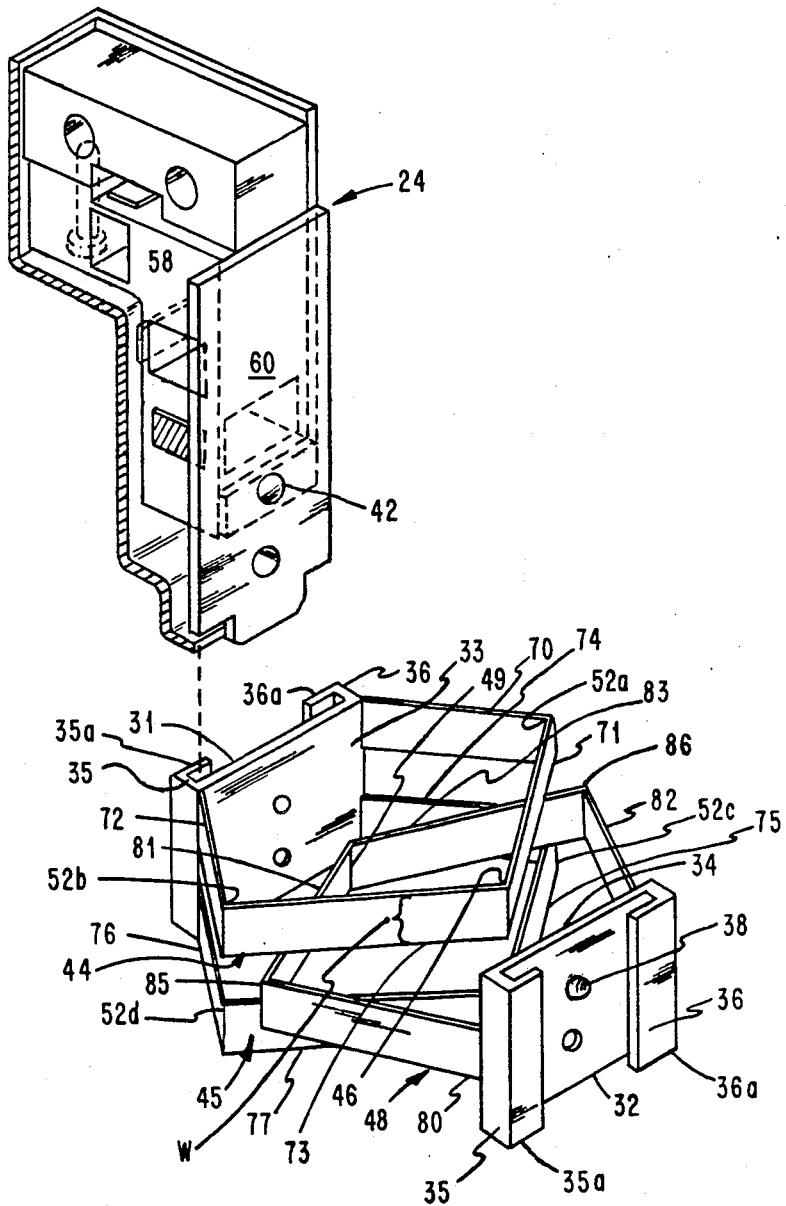
FIG. 3 is a schematic exploded view of one finger of the gripper as shown in FIG. 2, and the end of arm tool.

Links 26 are operated or controlled by a hydraulic motor 27, mounted within the frame, which displaces a rack 28 to drive a pair of sector gears 29 connected to the links 26. Hydraulic motor 27 is controlled by computer 16 through hydraulic power source 17. The fingers 24 and 25 are operable to move toward and away from one another simultaneously with the facing surfaces remaining parallel to one another. The clamps 31 and 32 of the end-of-arm tool are shown connected to the respective fingers 24 and 25 of the gripper 15. As shown in FIG. 3, the clamps 31 and 32 each have a facing flate surface 33 and 34 with an L-shaped flange 35 and 36 extending vertically from the back surface thereof along each left and right side edges. The horizontal portions 35A and 36A of the L-shaped flanges 35 and 36 face one another at a distance equal to the width of a finger 24. Each L-shaped flange 35 and 36 forms a groove along opposite side edges of each clamp 31 and 32 so that the clamps can slide onto respective fingers 24 and 25. The clamps 31 and 32 are located and locked into position by means of the spring-loaded ball detent 38 located on the back of the flat surface plate of the clamps 31 and 32. The ball 38 cooperates with a hole or cutout portion 42 in the finger 24 to which the clamp is attached. This hole 42 receives the ball 38 and positions and holds the respective clamp 31 and 32 in place for further operation of the end of arm tool.

Figure 4:
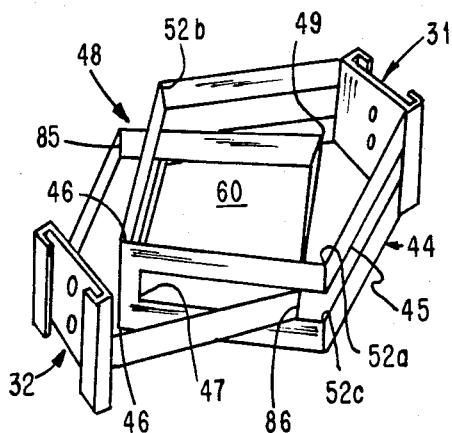
FIG. 4 is an isometric view of the tool of the invention showing the cooperation of the two parts.

As seen in FIG. 3, the left hand clamp 31 has a pair of closed loop holding bands 44 and 45 extending from the front face 33 of the clamp terminating in an inward facing corner or angle 46 which is at the outer extremity thereof. The pair of closed looped holding bands 44 and 45 extend from the left and right side edges of the clamp 31 in parallel planes. The pair of holding bands 44 and 45 in the parallel planes are separated from one another by at least the width of a band. As shown in FIG. 4, this pair of bands 44 and 45 can be connected together at the outer end thereof between the inward facing corners 46. This connection 47 between the two bands 44 and 45 has the same inward facing angle as the inward facing corner 46 at the outer tip of each band of the pair of holding bands 44 and 45. The angle is approximately 90 degrees to give a corner or groove into which a narrow element to be grasped will fit. As seen in FIGS. 3 and 4, a single closed loop holding band 48 extends from the other clamp 32 attached to the other finger of the gripper. This closed loop holding band 48 extends from the middle of the left and right side edges of the face of the opposite clamp 32 at right angles such that the band fits into the space between the pair of bands 44 and 45. The outer tip of this single closed loop holding band 48 has an inward facing angle or corner 49 of approximately 90 degrees similar to the other holding band angles of the pair of holding bands 44 and 45. This angle or corner 49 is within the horizontal planar area encompassed by the pair of holding bands 44 and 45. The holding band 48 has a right and left hand section looking toward the front surface 34 of the clamp 32. The right hand section consists of a first straight line segment 80 which starts at the front surface 34 of the clamp 32 and extends to the side corner 85 and the straight line segment 81 extends from the corner 85 to the outer corner 49. The left hand section consists of a first straight line segment 82 which extends from the front surface 34 of the clamp 32 to the side corner 86. The second straight line segment 83 extends from the side corner 86 to the outer corner 49.

Each of the holding bands 44 and 45 has lateral side angles 52A, 52B, 52C, and 52D of approximately 90 degrees, each of which are inwardly facing and form the opposite side corners of an area within its holding band which is essentially pentagonal shaped. These lateral side angles 52A, 52B, 52C and 52D divide each side of the loops 44 and 45 into two straight line segments. the right straight line segments 70 and 71 of loop 44 extend from the surface 33 of clamp 31 to the angle or corner 52A and from the corner 52A to the outer corner 46, respectively. The left straight line segments 72 and 73 of loop 44 extend from the surface 33 of clamp 31 to the corner 52B and from the corner 52B to the outer corner 46, respectively. Similarly the right straight line segments 74 and 75 of loops 45 extend from the surface 33 of clamp 31 to the corner 52C and from the corner 52C to the outer corner 46, respectively. The left straight line segments 76 and 77 of loop 45 extend from the surface 33 of clamp 31 to the corner 52D and from the corner 52D to the outer corner 46, respectively.

The connector 47 shown in FIG. 4 and described above is used in applications where the grasping pressure applied by the single closed loop holding band 48, on the part being grasped in opposition to the opposite grasping force applied by the pair of closed loop holding bands 44 and 45, would be sufficient to cause bending or damage to the part grasped. It should be appreciated that connector 47 must be sufficiently narrow in width with respect to the diameter of the pin or the like to be grasped to allow the outer corner of the single closed loop holding band 48 to press against the pin laying in the inward facing angle or groove of the connector 47.

It can be seen in FIG. 4, that there is a common space or area 60 defined between the single band 48 and the pair of bands 44 and 45 when the single band 48 is interleaved with the pair of bands 44 and 45. The area 60 is bounded by the inward facing angle 49 at the outer end of the single band 48, the inner corner 46 and connector 47 of the parallel pair of bands 44 and 45 and the points on the straight line segments of the pair of bands 44 and 45 where they cross one another. This area varies as the pair of bands 44 and 45 and the single band 48 move toward or away from each other. When the single band 48 and the pair of bands 44 and 45 are moved toward each other so that the single band 48 extends further into the area between the pair of bands 44 and 45, the common area 60 is enlarged. Similarly, as the manipulator fingers and consequently the single band 48 and the pair of bands 44 and 45 are moved away from one another, the common area 60 diminishes.

Figure 5:
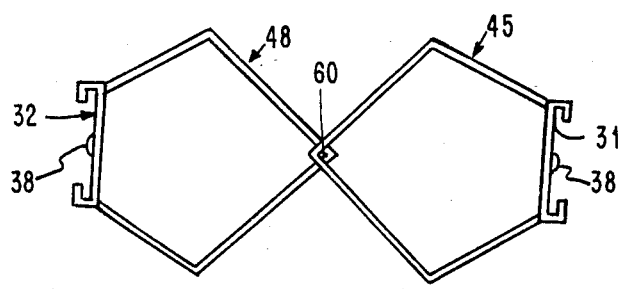
FIG. 5 is a plan view of the end of arm tool of this invention showing the tool in its fully closed position.
Figure 6:
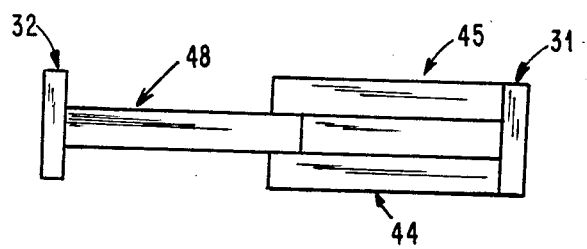
FIG. 6 is a side view of the end of arm tool shown in FIG. 5.
Figure 7:
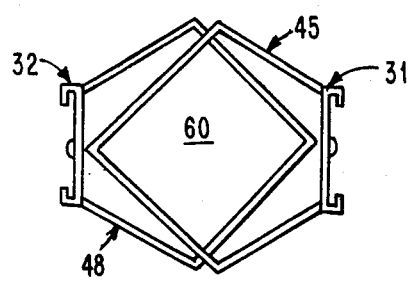
FIG. 7 is a further plan view of the end of arm tool of this invention showing the tool in its fully open position.

FIG. 7 shows the end of arm tool in its fully opened position. In this open position it will be noted that there is a square area 60 defined by the sections of the pair of holding bands 44 and 45 and the sections of the single holding band 48 which extend beyond the crossover points. As can be best seen in FIG. 4, this square area 60 diminishes as the pair of holding bands 44 and 45 and the single holding band 48 moved away from each other until the area is reduced to a small gripping area shown in FIG. 5. It will be appreciated that the connector 47 between the parallel bands of the pair of holding bands 44 and 45 at the outer tip thereof intercepts the outer inward facing angle of the single holding band 48 when the pair and single holding bands are moved apart. Thus, a component, for instance a thin vertical standing part such as a pin, is centered and grasped when located in the square area 60 defined between the holding bands 44 and 45 and the single holding band 48 and the pair of holding bands and the single band are moved away from one another by the manipulator. As the fingers are moved from their open position defining the larger square to their closed position, the pair of bands 44 and 45 and the single band 48 tend to contact the object and guide it into the corner or grooves 46 and 49 at the respective ends of the bands until finally the object is contacted or gripped by both outer corners 46 and 49 and held in place due to the pressure applied by the gripper of the robot. It should be noted that the required motion of the grasping operation performed by the usual gripper. The inward facing angle 46 at the extremity of the holding parallel pair of holding bands 44 and 45 is shown as being approximately 90 degrees. However, there are other angles which will work depending on the size of the component to be grasped. This gives an accurate, light all around centering and grasping tool.

While there has been described what is at present considered to be a preferred embodiment of the invention, it will be obvious to those skilled in the art that various changes and modifications may be made therein without departing from the invention.

What is claimed is:

1. In a robot having a gripper including a pair of fingers and a drive means for driving the fingers toward and away from one another while said fingers remain parallel to each other;
an end-of-arm tool comprising:
a first clamp for attaching to one finger of said pair of fingers;
a second clamp for attaching to the other finger of said pair of fingers;
a first closed loop holding band attached to said first clamp and extending therefrom at right angles in a predetermined plane;
a pair of closed loop holding bands attached to said second clamp and extending at right angles therefrom parallel to each other and separated by a space greater than the width of said first band;
said first closed loop holding band fitting into the space between said pair of closed loop holding bands;
an inward facing corner located at the outer tip of each closed loop holding band nearest the opposite finger towards which said closed loop holding band extends;
an inward facing V-shaped connector located between the bands of said pair of closed loop holding bands at the outer ends thereof having the same inward facing angle as the inward facing corner located at the outer tip of each of said bands;
a work space formed of the common area within said first and pair of closed loop holding bands, the work space becoming larger as the drive means moves said fingers toward one another and becoming smaller as the drive means moves said fingers away from one another;
said first closed loop holding band and said pair of closed loop holding bands are so shaped relative to one another to center and grasp in said inward facing corner an object located in said workspace as said fingers are moved away from one another.

2. An end of arm tool according to claim 1, wherein each of said inward facing corners located at the outer tip of each loop is substantially a right angle.

3. An end of arm tool according to claim 1, wherein said first closed loop holding band and said pair of closed loop holding bands each have at least a pair of straight line segments separated by an inward facing angle forming the sides of said loops.

4. An end of arm tool according to claim 1, wherein said inward facing angles and said straight line segments are of a size and length to create a substantially square work space.

5. An end of arm tool according to claim 1, wherein said first and second clamps form the inner end of each of said first closed loop holding band and said pair of closed loop holding bands.

* * * * *